United States Patent [19]

Christ et al.

[11] 4,282,638

[45] Aug. 11, 1981

[54] CONTROLLED DEFLECTION ROLL

[75] Inventors: Alfred Christ, Zürich; Rolf Lehmann, Rudolfstetten, both of Switzerland

[73] Assignee: Escher Wyss Limited, Zürich, Switzerland

[21] Appl. No.: 107,134

[22] Filed: Dec. 26, 1979

[30] Foreign Application Priority Data

Jan. 22, 1979 [CH] Switzerland .......................... 603/79

[51] Int. Cl.³ .............................................. B21B 13/02
[52] U.S. Cl. .............................. 29/116 AD; 100/162 B
[58] Field of Search ................... 29/113 AD, 116 AD; 100/162 B, 170, 185

[56] References Cited

U.S. PATENT DOCUMENTS

| | | | |
|---|---|---|---|
| 3,726,338 | 4/1973 | Sorenson | 29/116 AD X |
| 3,932,921 | 1/1976 | Biondetti | 29/116 AD X |
| 3,994,367 | 11/1976 | Christ | 29/116 AD X |
| 4,023,480 | 5/1977 | Biondetti | 100/162 B |
| 4,106,405 | 8/1978 | Biondetti et al. | 100/162 B |
| 4,223,011 | 11/1980 | Bolender et al. | 29/116 AD |

Primary Examiner—Wayne L. Shedd
Attorney, Agent, or Firm—Werner W. Kleeman

[57] ABSTRACT

A heated controlled deflection roll equipped with spraying devices arranged in the intermediate space or compartment between the stationary roll support and the roll shell. The spraying devices have walls confronting the inner surface of the roll shell and at which walls there are formed openings which, during operation, form liquid jets. Oil which is infed to the spraying devices can be heated in a collecting container and/or in a tubular conduit. Temperature regulation of the roll shell can also be accomplished by a throughflow or quantitative regulation by means of valves. If there are present a number of temperature zones in the lengthwise direction of the roll shell then different spray devices can be operatively associated with partition walls, from which the liquid is infed to separate collecting containers. From these collecting containers the liquid is again infed, by means of separate pressure lines, to the individual spray devices.

17 Claims, 6 Drawing Figures

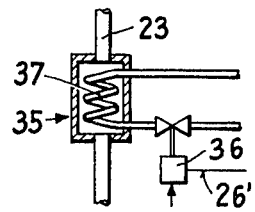
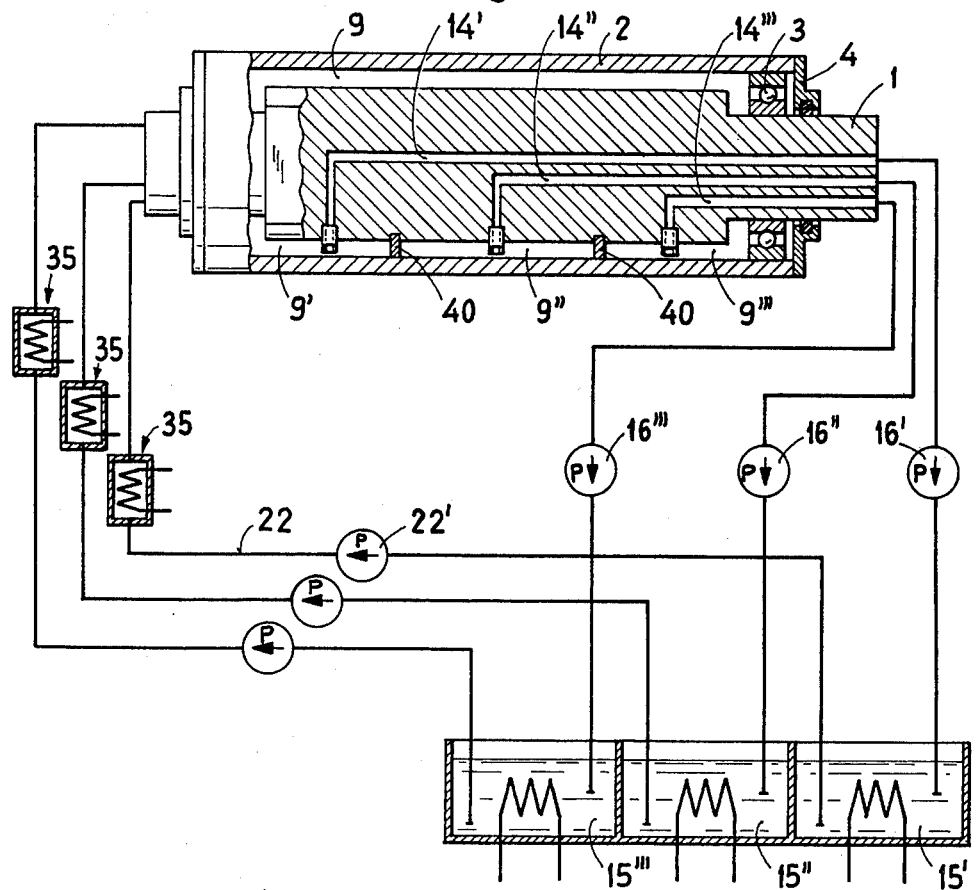
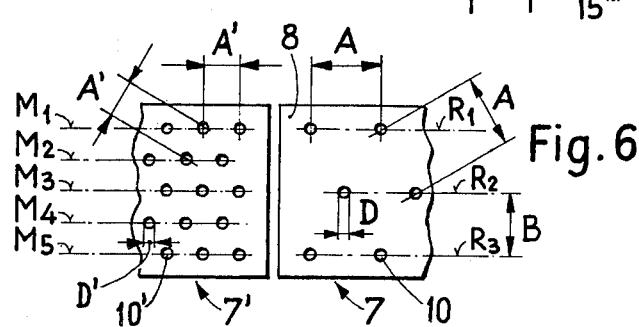

CONTROLLED DEFLECTION ROLL

CROSS REFERENCE TO RELATED CASE

This application is related to our commonly assigned, copending U.S. application Ser. No. 107,135, filed Dec. 26, 1979, entitled "HEATED CONTROLLED DEFLECTION ROLL".

BACKGROUND OF THE INVENTION

The present invention relates to a new and improved construction of a controlled deflection roll which is of the type comprising a stationary support and a roll shell rotatable about the stationary support. Between the roll shell and the stationary support there is located an intermediate space or compartment. At least one spray device is arranged at the stationary support for the purpose of spraying the inner surface of the roll shell with jets of a heat carrying liquid which is at a regulated temperature.

A controlled deflection roll of this type—also sometimes referred to in the art as a roll with bending or sag compensation—is known from Swiss Pat. No. 577,598, particularly FIG. 4 thereof. With this heretofore known controlled deflection roll, which also can be constructed in accordance with the teachings of U.S. Pat. No. 3,802,044, and U.S. Pat. No. 3,885,283, a pipe or conduit is located in the intermediate space or compartment between the roll support and the roll shell. This pipe or conduit is provided with spray nozzles and there is infed thereto heated oil which has been heated on a heating device. The heated oil is sprayed against the inner wall or surface of the roll shell.

SUMMARY OF THE INVENTION

It is therefore a primary object of the present invention to improve upon such state-of-the-art controlled deflection rolls, and specifically, to appreciably increase the heat transfer between the heat carrier and the roll shell, in order to thereby particularly obtain a controlled deflection roll which is suitable for operation at high temperatures and with high heating output, as such for instance is needed for calenders for processing plastic materials.

The controlled deflection roll of the present development, by means of which this objective is realized and others which will become more readily apparent as the description proceeds, is manifested by the features that the spray device has openings which are distributed according to an essentially uniform pattern. These openings serve for the formation of compact, at least in part mutually parallelly extending liquid jets or streams. These liquid jets or streams are directed towards the inner surface of the roll shell and deviate from a normal or line perpendicular to the inner surface of the roll shell by at most 30°.

Through the provision of the spray or spraying device it is possible to bring into contact with the roll shell a large quantity of heat carrier-liquid, and the sprayed jets, owing to their relatively large relative velocity in relation to the surface of the roll shell, render possible extremely good heat transfer. Both of these aspects lead to an extremely intensive heat transfer from the liquid in the roll shell.

The openings preferably can be arranged in spaced relationship from one another such that the spacing between the openings amounts to about five to fifteen times the diameter of the openings. Due to this feature there is obtained an optimum heat transfer between the spray jets and the wall of the roll shell, since the jets, on the one hand, do not mutually hinder one another and, on the other hand, there is obtained a sufficient uniformity of the thermal action, especially heating of the roll shell.

In order to obtain particularly high heat transfer the openings can be arranged in a number of rows which are essentially parallel to the lengthwise axis of the controlled deflection roll, wherein the jets emanating from the openings of a row are mutually parallel to one another, and the openings of neighboring rows are mutually offset.

The spacing and/or diameter of the openings, in accordance with the desired intensity of the heat transmission, can be different at different axial sections of the controlled deflection roll. Preferably, for instance, in the case of a heated controlled deflection roll, it is possible to prevent, by increased infeed of thermal energy or heat to the end regions of the roll shell, that there arises a temperature drop at such locations which would othewise occur.

The length of the liquid jets between their efflux from the related opening and their impact at the inner wall of the roll shell preferably can amount to four to ten times the diameter of such opening. In this way there is insured for a compact configuration or shape of the liquid jet, which, in turn, affords good heat transfer between the liquid and the roll shell.

In the case of a controlled deflection roll where the roll shell is hydraulically supported upon the roll support, it is possible for the hydraulic medium of the supporting arrangement to serve as the heat carrier-liquid of the spray device. In this way there is obtained a particular simplification of the construction of the controlled deflection roll, although it would be conceivable to use for both purposes different liquids, provided that they can be properly separated from one another.

The spray device can be connected by means of an infeed line or conduit with a container which is provided with a device for influencing the temperature of the liquid. Also in this case a particular simplification of the system design can be realized in that the normally always available collecting container can be simultaneously used for heating or cooling the liquid. However, the spray device also can be connected with an infeed line or conduit in which there is located a device for influencing the temperature of the heat carrier-liquid. In many instances it can be advantageous to first bring the heat carrier-liquid to the desired temperature in the line or conduit leading to the spray device.

It is possible to arrange a number of spray devices in distributed fashion in the axial direction of the controlled deflection roll. These plurality of spray devices can be connected with separate infeed lines or conduits for heat carrier-liquid at different temperatures. In this way it is possible in a most simple manner to differently affect the temperature of the roll shell along its length. In the normal case heating of the controlled deflection roll at its ends is somewhat intensified, in order to compensate the frequently arising temperature reduction arising at such ends in the case of a heated controlled deflection roll.

With such type controlled deflection roll having a number of spray devices arranged in a distributed fashion over the axial direction of the controlled deflection roll these spray devices can be connected by means of branch lines or conduits with devices which influence the temperature of the heat carrier-liquid. These devices branch off of a common infeed line or conduit leading from a collecting container, which likewise is provided with a device for influencing the temperature of the liquid. In this instance a particularly economical operation of the system is realized in that, the liquid streams infed to the spray devices initially are brought, in the collecting container, to a common equal temperature, whereafter then there is formed in the branch lines only the temperature differences of the individual streams.

With all of these embodiments a throttle element can be arranged in the infeed line, serving for adjusting the quantity of liquid which is infed to the spraying or spray device. This throttle element enables an extremely simple influencing of the temperature of the roll shell by altering the throughflow quantity with constant temperature of the heat carrier-liquid.

However, the device for influencing the temperature also can be provided with a heating or cooling device, whose output can be influenced by a regulation device as a function of the desired temperature of the roll shell.

Both of these regulation techniques, namely the quantitative regulation by means of the throttle element and equally the temperature regulation by the heating or cooling device, can be performed separately or also conjointly.

In the case of a controlled deflection roll having a number of spraying devices distributively arranged in the axial direction of the controlled deflection roll, it is possible to operatively associate partition walls with the individual spraying devices. These partition walls separate, at least in part from one another, the portions or sections of the intermediate space correlated to the individual spraying devices, each section or portion being provided with a special outfeed or withdrawal line opening into a special collecting container. In this way it is possible to effectively counteract the admixing of the flow streams of the heat carrier-liquid at different temperatures, so that, for instance, there can be prevented too great cooling of the hotter liquid stream. In this way there is realized a beneficial saving in energy.

It is constructively possible for the spray device to have a flat or slightly domed wall which confronts the inner wall of the roll shell. At this flat or slightly domed wall there are formed openings for the formation of the liquid jets which impact against the inner wall of the roll shell. In this way, with the aid of very simple means, it is possible to produce the jet density needed for obtaining large thermal outputs. At the same time it is also possible to arrange the jets in different patterns, in order for instance to produce a desired distribution of the thermal energy or heat at the roll shell.

Preferably, the spray device should be arranged at a region of the intermediate space of the controlled deflection roll which is disposed between the roll support and the roll shell and which is located externally of the region of a liquid sump or pool disposed in such intermediate space or compartment. In this way there is obtained the benefit that the jets of the heat carrier-liquid are guided while being hindered as little as possible by air and can impact against the inner surface of the roll shell. Consequently, there is insured for an optimum heat transfer effect.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a modified detail of the arrangement of FIG. 1;

FIG. 5 is a schematic view, corresponding to the showing of FIG. 1, of a further embodiment of controlled deflection roll; and FIG. 6 is an enlarged detail of the arrangement of FIG. 1, showing a somewhat modified construction of the spraying device.

DETAILED DESCRIPTION OF THE PREFERRED EMBODIMENTS

Figure 1:
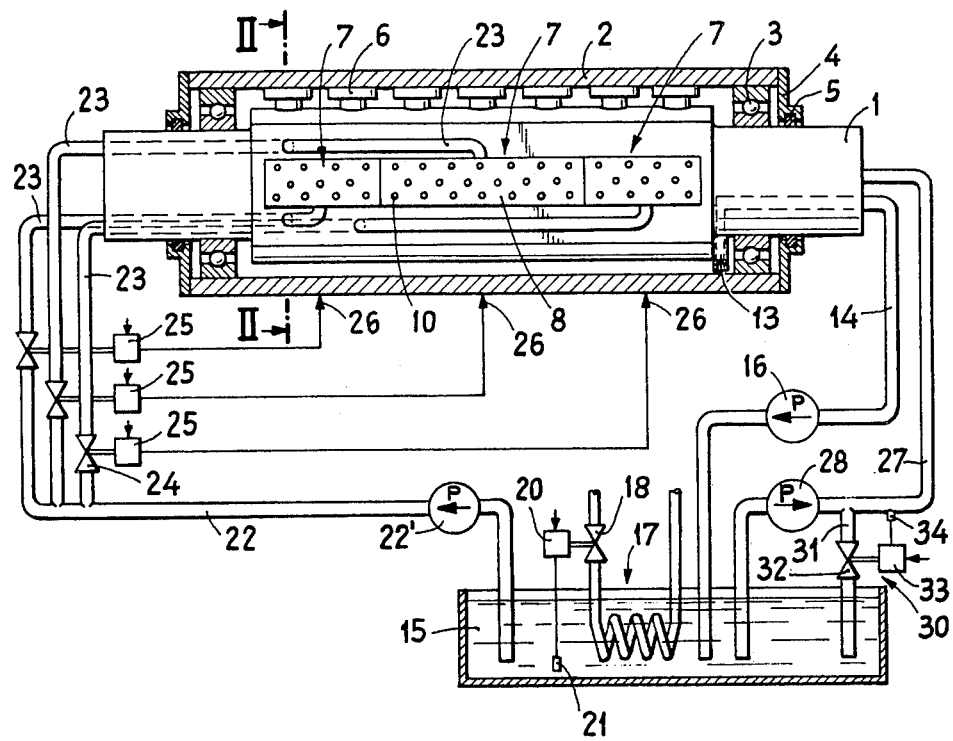
FIG. 1 schematically illustrates, partially in sectional view, a controlled deflection roll in conjunction with the related supply device or arrangement.

Describing now the drawings, in FIG. 1 there is shown by way of example a controlled deflection roll in partial sectional view, which is constructed in accordance with the teachings of U.S. Pat. No. 3,802,044 to which reference may be had and the disclosure of which is incorporated herein by reference. The controlled deflection roll will be seen to contain a stationary support 1 which is fixedly guided in a not particularly shown framework of a rolling mill or the like, i.e., non-rotatably supported. Further, there is provided a roll shell 2 which is rotatable about the stationary roll support 1. This roll shell 2 is rotatably mounted at the stationary support 1 in roller bearings 3 or equivalent structure. The ends of the roll shell 2 are closed by closure disks or plates 4 with the aid of seals 5. In the stationary support 1 there are sealingly hydrostatically guided pressure or support elements 6, here shown in the form of support pistons, upon which there is supported the roll shell 2. These support pistons 6, which are known from the aforementioned U.S. Pat. No. 3,802,044, are not part of the invention and therefore have only been schematically illustrated, since the details thereof are unimportant for the purposes of this disclosure.

Figure 2:
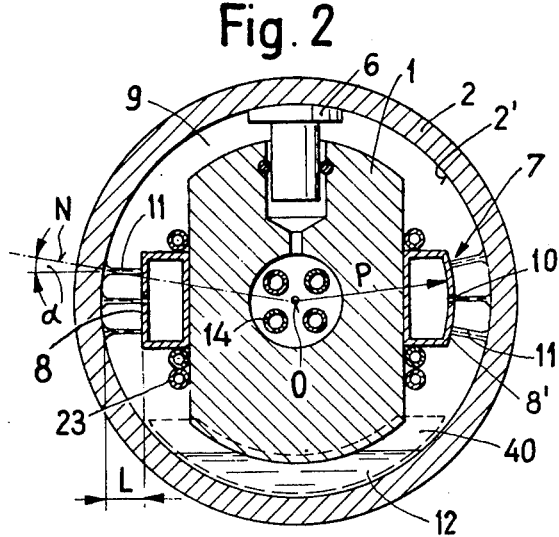
FIG. 2 is a cross-sectional view of the controlled deflection roll shown in FIG. 1, on a slightly enlarged scale, taken substantially along the line II—II thereof.

However, according to the invention, and as best seen by referring to FIG. 2, spray or spraying devices 7 are secured to the stationary roll support 1. In the arrangement under consideration these spraying devices 7 have the shape of boxes or casings. Each spraying device 7 has a wall 8 and 8', confronting the inner surface 2' of the roll shell 2, at which related wall there are formed openings 10 from which emanate during operation, spray jets 11 of a heat carrier-liquid. The spray jets impact against the inner surface or wall 2' of the roll shell 2 and thus influence the temperature thereof. The heat carrier-liquid forms at the lower region of the roll shell 2 a sump or pool 12, from which it can be returned by a withdrawal or outfeed pipe or conduit 13 and a withdrawal line 14 back to a collecting container 15. A pump 16 can be arranged in the outfeed or withdrawal line 14.

As best seen by referring to FIG. 1, the collecting container 15, in the embodiment under discussion, since one is dealing with a heated controlled deflection roll, is provided with a heating device 17. The heating device 17 is shown, by way of example, as a tubular coil having a valve 18. The valve 18 is actuated by a regulator 20, which is controlled by a temperature feeler or sensor 21. The heating device 17, when low temperatures are needed, can work with hot water or with steam. For higher temperatures there can be provided a standard electrical resistance heater. In such case the valve 18 is replaced by a corresponding switch.

As further seen by referring to FIG. 1, the heat carrier-liquid located in the collecting container 15 is fed, by means of an infeed line or conduit 22 equipped with a pump 22', to branch lines or conduits 23, each of which has a valve 24 actuated by a temperature regulator 25. Each temperature regulator 25 receives a measuring signal from a temperature sensor or feeler 26 which senses the temperature of the surface of the roll shell 2.

By further reverting to FIG. 1 it will be seen that a pressure line or conduit 27 equipped with a pump 28 and a pressure regulating device 30 leads from the collecting container to the hydrostatic pressure or support elements 6. The pressure regulating device 30 contains in conventional fashion and overflow line 31 provided with a regulation valve 32, activated by a regulator 33 as a function of the operation of a pressure measuring device 34.

With the embodiment of FIG. 1 the spray devices 7 and also the pressure or support elements 6, i.e. the support pistons, have infed thereto the liquid from the same collecting container 15, and specifically, at the same temperature. Stated in another way: the hydraulic medium used for the support of the roll shell 2 is simultaneously employed as the heat carrier-liquid for the spraying devices. This is rendered possible in that this liquid, as a general rule, is an oil which is quite suitable for use as a heat carrier. At the same time by virtue of these measures there is realized an appreciable simplification of the construction of the controlled deflection roll and the supply device.

During operation, in the case of the controlled deflection roll of FIGS. 1 and 2, the liquid removed from the container 15 and having a desired temperature, is pumped by the pump 22' into the infeed line or conduit 22 and then infed to the spray or spraying devices 7. The regulators 25 together with the valves 24 afford a quantitative regulation of the liquid flow, so that depending upon the thermal requirements at the region of the individual spray devices 7 it is possible to spray a greater or lesser amount of heat carrier-liquid at the same temperature.

FIG. 4 illustrates a device for influencing the temperature of the heat carrier-liquid, which can be used in conjunction with or in place of the valve 24 of the arrangement of FIG. 1. According to the showing of FIG. 4 there is arranged in the branch line or conduit 23 a schematically illustrated heating device 35, whose heating output is controlled by a regulator 36 as a function of a measuring signal which is infed by a signal line 26'. Also in this case the schematically illustrated heating device 35 is provided with a heating coil 37, but it is however also conceivable to provide an electrical heating spiral or a similar heating element.

The controlled deflection roll shown schematically in FIG. 5 differs from the controlled deflection roll of FIG. 1 primarily in that, the portions of the intermediate space or chamber 9 between the roll support 1 and the roll shell 2, and correlated to the individual spraying devices 7, are separated from one another by partition or separation walls 40 or equivalent structure. One such partition wall 40 has been shown in phantom lines in FIG. 2. It extends over an appreciable part of the liquid sump or pool 12 and, in this manner, hinders to a large extent admixing of oil located at the different portions or sections and having temperatures differing from one another. The thus formed sections or portions 9', 9'', 9''' of the region of the intermediate space or compartment 9, where there is located the oil sump or pool 12, are connected by special outfeed or withdrawal lines 14', 14'' and 14''' with separate collecting containers 15', 15'' and 15''', respectively. The outfeed lines 14, 14'' and 14''' are provided with pumps 16', 16'' and 16''', respectively. Leading from the collecting containers 15', 15'' and 15''' are infeed lines 22 containing pumps 22' to the individual spraying or spray devices 7, which have not been shown in FIG. 5 in order to simplify the illustration. As needed, the pumps 22' can deliver a constant or variable quantity of liquid. Additionally, there are provided at the lines or conduits 22 heating devices of the type shown in FIG. 4, which in the same manner as the valves 24 of the arrangement of FIG. 1 are capable of being activated by temperature measuring feelers 26 provided at the roll shell 2.

Figure 3:
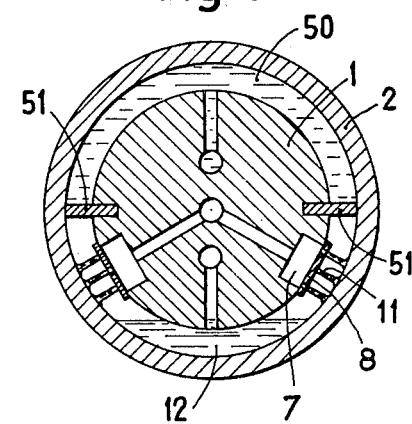
FIG. 3 is a sectional view, corresponding to the showing of FIG. 2, of a different construction of controlled deflection roll designed according to the invention.

FIG. 3 shows on an enlarged scale a section of the arrangement of FIG. 1, which essentially relates to the boundary region between the left and the intermediate spray device. However, the left spray device 7 has been replaced by a spray device 7' (see FIG. 6), containing a larger number of openings 10 than the intermediate spray device 7. In order to obtain symmetrical conditions of the temperatures of the roll shell it is of course possible to also replace the right-hand spray device 7 of FIG. 1 with a similar type of spray device 7'.

As best seen by referring to FIG. 6, and as also shown in FIG. 1, the spray device 7 contains bores 10 formed in the wall 8 thereof and having a diameter D, these bores being arranged in three rows R1, R2 and R3, and the bores 10 of a row having a spacing A from one another. These bores 10 are structured such that the jets emanating from the openings of a row are essentially parallel to one another. The bores 10 of the individual rows R1, R2 and R3 are mutually offset and, specifically, as shown in FIG. 6, by half of the pitch or division A. Moreover, the rows R1, R2 and R3 are located at a spacing B from one another chosen to be of a magnitude such that also the inclined spacing of the bores of neighboring rows mutually have therebetween the distance or space A. In order to obtain optimum conditions it is possible, as already explained, for the spacing A to amount to five to fifteen times the diameter D of the bores 10.

As far as the spray or spraying devices 7' are concerned, here the openings or bores 10' are arranged in five rows M1, M2, M3, M4 and M5, and the mutual spacing of the openings, as indicated by reference character A', is smaller than the spacing A of the openings 10. The diameter D' of the bores forming the openings 10 can be equal to the diameter D, but also can deviate therefrom.

The simplest construction of the openings resides in forming smooth, sharp edged cylindrical bores, which are most conducive to providing a uniform distribution of the liquid streams at the individual openings. It should however be understood that the bores also can be differently configured and, for instance, can have the shape of nozzles.

According to the left-hand portion of FIG. 2 and FIG. 3 the wall 8 of the spraying device has a flat or planar shape, and the axes of the bores 10 and 10' in the individual rows are parallel to one another. This produces the lowest fabrication costs. It is however also possible, according to the right-hand showing of FIG. 2, to design the wall 8' so as to be slightly domed or arched, and specifically preferably with a radius P which extends through the axis 0 of the roll support 1 and the roll shell 2. In this case also the bores 10 can be constructed such that the jets 11 emanating therefrom radially impinge against the inner surface 2' of the roll shell 2.

As best seen by referring to the left-hand side of FIG. 2, the jets 11 need not be directed perpendicular to the inner surface 2' of the roll shell 2. The direction of a jet 11 can enclose with the normal N at the location of impact an angle α. This angle α should however not be greater than 30° in order to obtain optimum conditions.

In FIG. 2 there is also designated by reference character L the length of a jet 11. This length L should amount to four to ten times the diameter D or D', as the case may be, of the related bore in order to avoid any unfavorable spraying of the jet 11 and, on the other hand, to insure for good outflow of the liquid.

It should be specifically understood that the invention is not limited to the examples of controlled deflection rolls shown in FIGS. 1, 2 and 5 of the U.S. Pat. No. 3,802,044. In principle, the teachings of the invention also can be employed with other types of controlled deflection rolls working according to hydraulic or hydrostatic principles or even a different principle.

Thus, in FIG. 3 there is illustrated in sectional view, corresponding to the showing of FIG. 2, a controlled deflection roll wherein a hydraulic pressure space or compartment 50 is provided between the roll support 1 and the roll shell 2, which is closed by ledge-like sealing elements 51. Such type controlled deflection roll is known for instance from U.S. Pat. No. 3,703,862.

With the controlled deflection roll as shown in FIG. 3 the spray devices 7 are constructed as grooves formed in the roll support 1, these grooves being closed by the walls 8. Moreover, the spray devices 7 can be connected in the same manner as explained in conjunction with the previously described embodiments.

Particularly worthy of mention as concerns other types of known constructions of controlled deflection rolls working with hydrostatic support arrangements, and with which the invention can be used, is especially the controlled deflection roll of German Pat. No. 2,165,118 and U.S. Pat. No. 4,089,094.

While there are shown and described present preferred embodiments of the invention, it is to be distinctly understood that the invention is not limited thereto but may be otherwise variously embodied and practised within the scope of the following claims. Accordingly,

What we claim is:

1. A controlled deflection roll comprising:
    a stationary roll support;
    a roll shell rotatable about said stationary roll support;
    means for rotatably mounting said roll shell for rotation about said stationary roll support;
    said stationary roll support and said rotatable roll shell coacting with one another so as to form therebetween an intermediate compartment;
    at least one spray device arranged at the stationary roll support for spraying an inner surface of the roll shell with jets of a heat carrier-liquid at a regulated temperature;
    said spray device being provided with openings distributed in accordance with a substantially uniform pattern;
    said openings serving for forming compact liquid jets extending at least in part in parallelism to one another and directed towards the inner surface of the roll shell; and
    said liquid jets deviating with respect to a normal taken at the inner surface of the roll shell by at most through an angle of 30°.

2. The controlled deflection roll as defined in claim 1, wherein:
    said openings are arranged in spaced relationship from one another amounting to about five to fifteen times their diameter.

3. The controlled deflection roll as defined in claim 1, wherein:
    said openings are arranged in a number of rows extending essentially parallel to the lengthwise axis of the controlled deflection roll;
    the liquid jets emanating from the openings of one row being essentially parallel to one another; and
    said openings of neighboring rows being mutually offset with respect to one another.

4. The controlled deflection roll as defined in claim 1, wherein:
    at least any one of the spacing or diameter of the openings are different at different predetermined axial portions of the controlled deflection roll as a function of the desired intensity of heat transmission.

5. The controlled deflection roll as defined in claim 1, wherein:
    the length of the liquid jets from its related opening to the inner wall of the roll shell amounts to about four to ten times the diameter of the opening.

6. The controlled deflection roll as defined in claim 1, further including:
    means for hydraulically supporting the roll shell upon the stationary roll support by means of a hydraulic medium; and
    said spraying device using as a heat carrier-liquid for forming the liquid jets the hydraulic medium used for hydraulically supporting the roll shell upon the stationary roll support.

7. The controlled deflection roll as defined in claim 1, further including:
    infeed line means;
    container means;
    said spray device being controlled by means of said infeed line means with said container means; and
    a device with which said container means is provided in order to influence the temperature of the liquid.

8. The controlled deflection roll as defined in claim 1, further including:
    infeed line means with which there is connected said spray device; and
    a device provided at said infeed line means for influencing the temperature of the heat carrier-liquid.

9. The controlled deflection roll as defined in claim 1, further including:
    a plurality of said spray devices arranged in the axial direction of the controlled deflection roll; and separate infeed line means for the heat carrier-liquid which is at different temperatures and with which there is connected the plurality of spray devices.

10. The controlled deflection roll as defined in claim 9, wherein:
   said spray devices are distributively arranged in the axial direction of the controlled deflection roll;
   branch line means with which the spray devices are connected;
   said branch line means being provided with devices for influencing the temperature of the heat carrier-liquid;
   a common infeed line from which branch off said devices;
   a collecting container from which extends said common infeed line; and
   said collecting container being provided with a device for influencing the temperature of the liquid.

11. The controlled deflection roll as defined in claim 10, wherein:
   a throttle element is arranged in at least one infeed line and serves to adjust the quantity of liquid which is infed to the related spray device.

12. The controlled deflection roll as defined in claim 10, wherein:
   said device for influencing the temperature comprises a heating or cooling device whose output can be influenced by a regulating device as a function of the desired temperature of the roll shell.

13. The controlled deflection roll as defined in claim 9, further including:
   partition walls operatively associated with the individual spray devices in order to at least partially separate portions of an intermediate compartment which are correlated to the individual spray devices; and
   each portion being provided with a respective outfeed line opening into a respective collecting container.

14. The controlled deflection roll as defined in claim 1, wherein:
   said spray device has a wall confronting the inner surface of the roll shell; and
   said wall having said openings for forming the liquid jets which impact against the inner surface of the roll shell.

15. The controlled deflection roll as defined in claim 14, wherein:
   said wall is substantially flat.

16. The controlled deflection roll as defined in claim 14, wherein:
   said wall is slightly domed.

17. The controlled deflection roll as defined in claim 1, wherein:
   said spray device is arranged at a region of an intermediate compartment of the controlled deflection roll which is located between the stationary roll support and the roll shell; and
   said region being located externally of a region of a liquid sump disposed in such intermediate compartment.

* * * * *